(12) United States Patent
Liu et al.

(10) Patent No.: US 11,146,108 B2
(45) Date of Patent: Oct. 12, 2021

(54) DEMODULATION APPARATUS AND METHOD FOR WIRELESS POWER TRANSMITTER

(71) Applicant: NuVolta Technologies (Hefei) Co., Ltd., Hefei (CN)

(72) Inventors: Sichao Liu, Shanghai (CN); Junxiao Chen, Shanghai (CN); Gang Dai, Shanghai (CN)

(73) Assignee: NuVolta Technologies (Hefei) Co., Ltd., Hefei (CN)

( * ) Notice: Subject to any disclaimer, the term of this patent is extended or adjusted under 35 U.S.C. 154(b) by 112 days.

(21) Appl. No.: 16/381,367

(22) Filed: Apr. 11, 2019

(65) Prior Publication Data

US 2019/0386517 A1 Dec. 19, 2019

Related U.S. Application Data

(60) Provisional application No. 62/685,595, filed on Jun. 15, 2018.

(51) Int. Cl.

| H01F 27/42 | (2006.01) |
| H01F 37/00 | (2006.01) |
| H01F 38/00 | (2006.01) |
| H02J 50/12 | (2016.01) |
| H02M 1/08 | (2006.01) |
| H02J 7/02 | (2016.01) |
| H02M 1/00 | (2006.01) |

(52) U.S. Cl.
CPC ............... *H02J 50/12* (2016.02); *H02M 1/08* (2013.01); *H02J 7/025* (2013.01); *H02M 1/0009* (2021.05)

(58) Field of Classification Search
CPC ............ H02J 50/12; H02J 7/025; H02J 50/80; H02M 1/08; H02M 2001/0009; H02M 3/3376; H02M 2007/4815; Y02B 70/10; H04B 1/04; H04B 17/11; H04B 17/15; H04B 2001/0491
USPC ......................................................... 307/104
See application file for complete search history.

(56) References Cited

U.S. PATENT DOCUMENTS

| 9,941,795 B1 * | 4/2018 | Mayega ............... G01R 19/003 |
| 2013/0051083 A1 * | 2/2013 | Zhao ....................... H02J 50/12 |
| | | 363/17 |
| 2018/0367050 A1 * | 12/2018 | Mnich ...................... B23K 9/16 |

FOREIGN PATENT DOCUMENTS

WO    WO2018163170    *    3/2018

* cited by examiner

*Primary Examiner* — Richard Tan
(74) *Attorney, Agent, or Firm* — Slater Matsil, LLP

(57) ABSTRACT

A device comprises a first current sense apparatus coupled to a first switching element of a power conversion apparatus, a second current sense apparatus coupled to a second switching element of the power conversion apparatus and a current sense processing apparatus configured to receive detected current signals from the first current sense apparatus and the second current sense apparatus, and generate an average current signal and a peak current signal.

20 Claims, 9 Drawing Sheets

DEMODULATION APPARATUS AND METHOD FOR WIRELESS POWER TRANSMITTER

PRIORITY CLAIM

This application claims the benefit of U.S. Provisional Application No. 62/685,595, filed on Jun. 15, 2018, entitled "Demodulation Apparatus and Method for Wireless Power Transmitter," which application is hereby incorporated by reference.

TECHNICAL FIELD

The present invention relates to a demodulation apparatus, and, in particular embodiments, to a demodulation apparatus in a transmitter of a wireless power transfer system.

BACKGROUND

As technologies further advance, wireless power transfer has emerged as an efficient and convenient mechanism for powering or charging battery based mobile devices such as mobile phones, tablet PCs, digital cameras, MP3 players and/or the like. A wireless power transfer system typically comprises a primary side transmitter and a secondary side receiver. The primary side transmitter is magnetically coupled to the secondary side receiver through a magnetic coupling. The magnetic coupling may be implemented as a loosely coupled transformer having a primary side coil formed in the primary side transmitter and a secondary side coil formed in the secondary side receiver.

The primary side transmitter may comprise a power conversion unit such as a primary side of a power converter. The power conversion unit is coupled to a power source and is capable of converting electrical power to wireless power signals. The secondary side receiver is able to receive the wireless power signals through the loosely coupled transformer and convert the received wireless power signals to electrical power suitable for a load.

In a wireless power transfer system, various control signals may be generated based upon the operating parameters at the secondary side receiver. The control signals may be transferred from the secondary side receiver to the primary side transmitter. In particular, the control signals may be transmitted from a receiver coil to a transmitter coil in the form of modulated signals using suitable modulation schemes. An analog sensing device such as an analog-front-end (AFE) is employed to detect the control signals, which may be included in the current and/or the voltage applied to the transmission coil. A demodulator at the primary side transmitter may be employed to demodulate the signals generated by the AFE and feed the demodulated signals to a transmitter controller so as to better control the operation of the transmitter.

As the power of the wireless power transfer system goes higher, there may be a need for precisely detecting the control signals, thereby controlling the operation of the transmitter in a reliable manner.

SUMMARY

These and other problems are generally solved or circumvented, and technical advantages are generally achieved, by preferred embodiments of the present disclosure which provide a demodulation apparatus in a transmitter of a wireless power transfer system.

In accordance with an embodiment, a device comprises a first current sense apparatus coupled to a first switching element of a power conversion apparatus, a second current sense apparatus coupled to a second switching element of the power conversion apparatus and a current sense processing apparatus configured to receive detected current signals from the first current sense apparatus and the second current sense apparatus, and generate an average current signal and a peak current signal.

In accordance with another embodiment, a method comprises detecting a current flowing through a transmitter of a wireless power transfer system through a first current sense apparatus coupled to a first switching element of the transmitter and a second current sense apparatus coupled to a second switching element of the transmitter, generating, by a current sense processing apparatus, a peak current signal, an average current signal and a peak voltage of the transmitter based upon detected current signals and feeding the peak current signal, the average current signal and the peak voltage of the transmitter into a signal selector through a demodulation apparatus.

In accordance with yet another embodiment, a system comprises a bridge converter having inputs coupled to a power source and outputs connected to an inductor-capacitor tank, a current sense apparatus configured to detect a current flowing through the inductor-capacitor tank, a current sense processing apparatus configured to generate a peak current, an average current and a peak voltage of the inductor-capacitor tank based upon detected current signals from the current sense apparatus and a demodulation apparatus converting the peak current, the average current and the peak voltage of the inductor-capacitor tank into digital signals.

An advantage of an embodiment of the present disclosure is a demodulation apparatus in a transmitter of a wireless power transfer system for precisely demodulating the control signals from the receiver of the wireless power transfer system, thereby improving the performance of the wireless power transfer system.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a demodulation apparatus in a transmitter of a wireless power transfer system. The disclosure may also be applied, however, to a variety of power systems. Hereinafter, various embodiments will be explained in detail with reference to the accompanying drawings.

Figure 1:
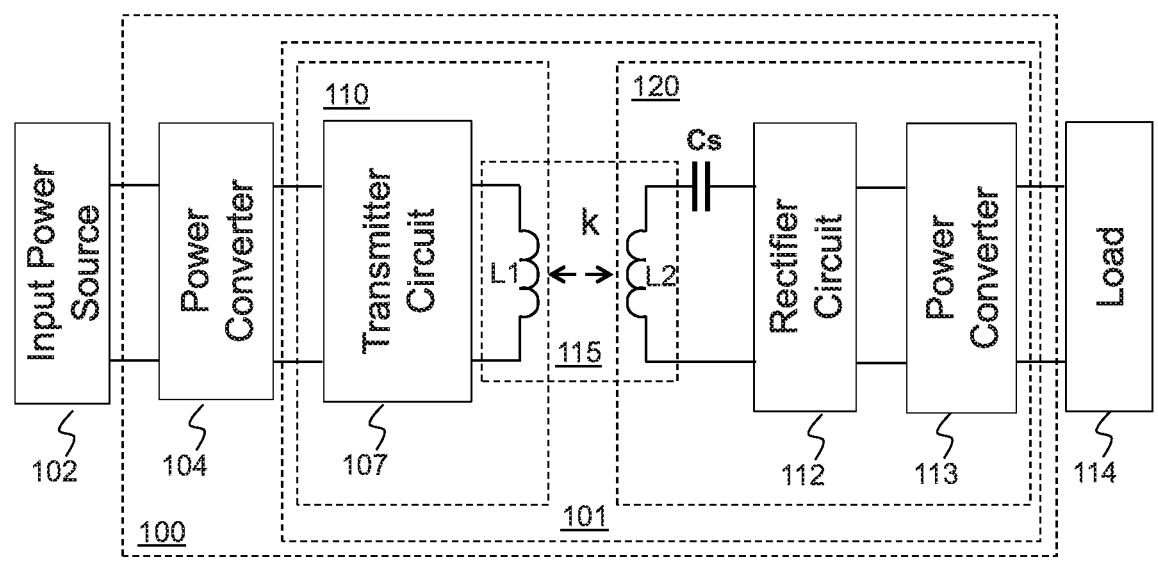
FIG. 1 illustrates a block diagram of a wireless power transfer system in accordance with various embodiments of the present disclosure.

FIG. 1 illustrates a block diagram of a wireless power transfer system in accordance with various embodiments of the present disclosure. The wireless power transfer system 100 comprises a power converter 104 and a wireless power transfer device 101 connected in cascade between an input power source 102 and a load 114. In some embodiments, the power converter 104 is employed to further improve the performance of the wireless power transfer system 100. In alternative embodiments, the power converter 104 is an optional element. In other words, the wireless power transfer device 101 may be connected to the input power source 102 directly.

The wireless power transfer device 101 includes a power transmitter 110 and a power receiver 120. As shown in FIG. 1, the power transmitter 110 comprises a transmitter circuit 107 and a transmitter coil L1 connected in cascade. The input of the transmitter circuit 107 is coupled to an output of the power converter 104. The power receiver 120 comprises a receiver coil L2, a resonant capacitor Cs, a rectifier 112 and a power converter 113 connected in cascade. As shown in FIG. 1, the resonant capacitor Cs is connected in series with the receiver coil L2 and further connected to the inputs of the rectifier 112. The outputs of the rectifier 112 are connected to the inputs of the power converter 113. The outputs of the power converter 113 are coupled to the load 114.

The power transmitter 110 is magnetically coupled to the power receiver 120 through a magnetic field when the power receiver 120 is placed near the power transmitter 110. A loosely coupled transformer 115 is formed by the transmitter coil L1, which is part of the power transmitter 110, and the receiver coil L2, which is part of the power receiver 120. As a result, electrical power may be transferred from the power transmitter 110 to the power receiver 120.

In some embodiments, the power transmitter 110 may be inside a charging pad. The transmitter coil L1 is placed underneath the top surface of the charging pad. The power receiver 120 may be embedded in a mobile phone. When the mobile phone is placed near the charging pad, a magnetic coupling may be established between the transmitter coil L1 and the receiver coil L2. In other words, the transmitter coil L1 and the receiver coil L2 may form a loosely coupled transformer through which a power transfer occurs between the power transmitter 110 and the power receiver 120. The strength of coupling between the transmitter coil L1 and the receiver coil L2 is quantified by the coupling coefficient k. In some embodiments, k is in a range from about 0.05 to about 0.9.

In some embodiments, after the magnetic coupling has been established between the transmitter coil L1 and the receiver coil L2, the power transmitter 110 and the power receiver 120 may form a power system through which power is wirelessly transferred from the input power source 102 to the load 114.

The input power source 102 may be a power adapter converting a utility line voltage to a direct-current (dc) voltage. Alternatively, the input power source 102 may be a renewable power source such as a solar panel array. Furthermore, the input power source 102 may be any suitable energy storage devices such as rechargeable batteries, fuel cells, any combinations thereof and/or the like.

The load 114 represents the power consumed by the mobile device (e.g., a mobile phone) coupled to the power receiver 120. Alternatively, the load 114 may refer to a rechargeable battery and/or batteries connected in series/parallel, and coupled to the output of the power receiver 120. Furthermore, the load 114 may be a downstream power converter such as a battery charger.

The transmitter circuit 107 may comprise primary side switches of a full-bridge converter according to some embodiments. Alternatively, the transmitter circuit 107 may comprise the primary side switches of any other suitable power converters such as a half-bridge converter, a push-pull converter, any combinations thereof and/or the like.

It should be noted that the power converters described above are merely examples. One having ordinary skill in the art will recognize other suitable power converters such as class E topology based power converters (e.g., a class E amplifier), may alternatively be used depending on design needs and different applications.

The transmitter circuit 107 may further comprise a resonant capacitor (not shown). The resonant capacitor and the magnetic inductance of the transmitter coil may form a resonant tank. Depending on design needs and different applications, the resonant tank may further include a resonant inductor. In some embodiments, the resonant inductor may be implemented as an external inductor. In alternative embodiments, the resonant inductor may be implemented as a connection wire.

The power receiver 120 comprises the receiver coil L2 magnetically coupled to the transmitter coil L1 after the power receiver 120 is placed near the power transmitter 110. As a result, power may be transferred to the receiver coil and further delivered to the load 114 through the rectifier 112. The power receiver 120 may comprise a secondary resonant capacitor Cs as shown in FIG. 1. Throughout the description, the secondary resonant capacitor Cs may be alternatively referred to as a receiver resonant capacitor.

The rectifier 112 converts an alternating polarity waveform received from the output of the receiver coil L2 to a single polarity waveform. In some embodiments, the rectifier 112 comprises a full-wave diode bridge and an output capacitor. In alternative embodiments, the full-wave diode bridge may be replaced by a full-wave bridge formed by switching elements such as n-type metal oxide semiconductor (NMOS) transistors.

Furthermore, the rectifier 112 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices, gallium nitride (GaN) based power devices and/or the like. The detailed operation and structure of the rectifier 112 are well known in the art, and hence are not discussed herein.

The power converter 113 is coupled between the rectifier 112 and the load 114. The power converter 113 is a non-isolated power converter. In some embodiments, the power converter 113 is implemented as a step-down power converter such as a buck converter. In alternative embodiments, the power converter 113 is implemented as other suitable power converters such as a four-switch buck-boost power converter.

Furthermore, information (e.g., control signals) may be sent from the power receiver 120 to the power transmitter 110. In some embodiments, the information transferred between the power receiver 120 and the power transmitter 110 can be used to ensure the authenticity of the receiver system before the power transmitter 110 transfers full power to the power receiver 120. In alternative embodiments, the information can also be used to improve the operation mode of the power transmitter 110.

In order to transfer the information transferred between the power receiver 120 and the power transmitter 110, a modulator (not shown) may be connected to the power receiver 120. The modulator converts the control information into a control message by applying a suitable modulation scheme (e.g., amplitude shift keying modulation and frequency shift keying modulation) to the control information. The control message is transferred from the power receiver 120 to the power transmitter 110 with the wireless power signal. For example, the control message may be superimposed on a current flowing through the receiver coil. The control message may result in a change of the current and/or the voltage of the transmitter coil. Therefore, the change of the current and/or the voltage of the transmitter coil in the transmitter can be detected by a sensing apparatus such as AFE. A demodulator (not shown) at the power transmitter 110 may perform a demodulation process to acquire the control message sent from the power receiver 120. The detailed demodulation process will be described below with respect to FIGS. 2-9.

Figure 2:
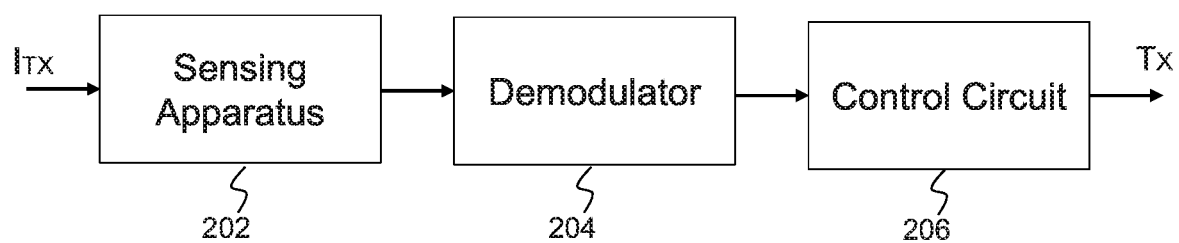
FIG. 2 illustrates a block diagram of a configuration of a demodulator and the associated functional units in accordance with various embodiments of the present disclosure.

FIG. 2 illustrates a block diagram of a configuration of a demodulator and the associated functional units in accordance with various embodiments of the present disclosure. The power transmitter 110 (shown in FIG. 1) may comprise a sensing apparatus 202, a demodulator 204 and a control circuit 206 connected in cascade as shown in FIG. 2. The sensing apparatus 202 is configured to detect the current flowing through the power transmitter. More particularly, the sensing apparatus 202 is configured to detect the current flowing through the resonant tank of the power transmitter. The sensing apparatus 202 may generate a variety of signals such as an average current signal, a peak current signal and a peak voltage signal based on the detected current. The signals generated by the sensing apparatus 202 are fed into the demodulator 204 as shown in FIG. 2. The detailed circuit diagram and operating principle of the sensing apparatus 202 will be described below with respect to FIGS. 3-4.

The demodulator 204 is employed to demodulate the information in the signals generated by the sensing apparatus 202 and convert the information into a plurality of digital signals. In some embodiments, the demodulator 204 comprises a single demodulation channel shared by three signals (e.g., the average current signal, the peak current signal and the peak voltage signal) generated by the sensing apparatus 202. In alternative embodiments, the demodulator 204 comprises three demodulation channels coupled to the three signals generated by the sensing apparatus 202 respectively. Furthermore, the demodulator 204 may comprise two demodulation channels. For example, one demodulation channel is shared by a first signal and a second signal generated by the sensing apparatus 202, and the other demodulation channel is used by a third signal generated by the sensing apparatus 202. The detailed operating principle of the demodulator 204 will be described below with respect to FIGS. 5-6. Throughout the description, the demodulator 204 may be alternatively referred to as a demodulation apparatus 204.

The control circuit 206 is configured to receive the digital signals generated by the demodulator 204. Based upon the received signals, the control circuit 206 adjusts the operation of the power transmitter accordingly.

Figure 3:
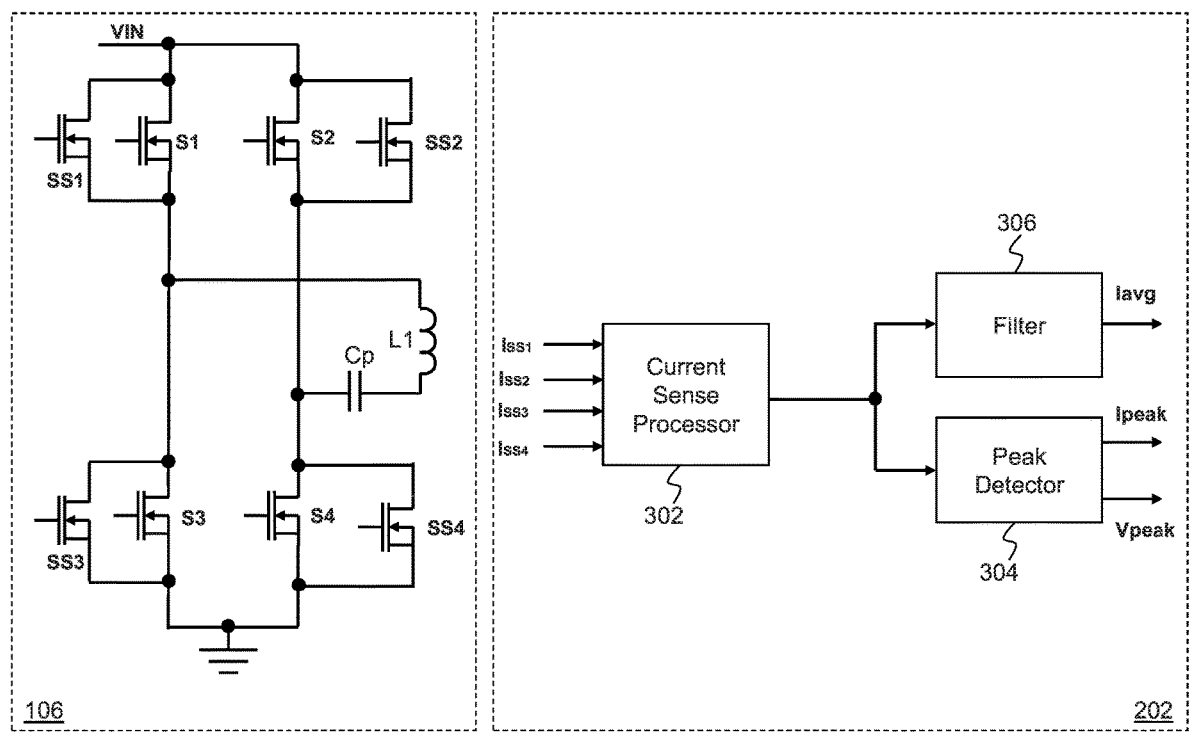
FIG. 3 illustrates a schematic diagram of a full-bridge converter and a block diagram of the sensing apparatus in accordance with various embodiments of the present disclosure.

FIG. 3 illustrates a schematic diagram of a full-bridge converter and a block diagram of the sensing apparatus in accordance with various embodiments of the present disclosure. The power transmitter may comprise a full-bridge converter 106. The full-bridge converter 106 has inputs coupled between an input voltage VIN and ground. The outputs of the full-bridge converter 106 are connected to a resonant tank formed by the transmitter coil L1 and the transmitter resonant capacitor Cp.

The full-bridge converter 106 includes four switching elements, namely S1, S2, S3 and S4. As shown in FIG. 3, the switching elements S1 and S3 are connected in series between the input voltage VIN and ground. Likewise, the switching elements S2 and S4 are connected in series between the input voltage VIN and ground. The common node of the switching elements S1 and S3 is coupled to a first input terminal of the transmitter coil L1. The common node of the switching elements S2 and S4 is coupled to a second input terminal of the transmitter coil L1 through the resonant capacitor Cp.

According to some embodiments, the switching elements S1, S2, S3 and S4 are implemented as MOSFET or MOSFETs connected in parallel, any combinations thereof and/or the like. According to alternative embodiments, the switching elements (e.g., switch S1) may be an insulated gate bipolar transistor (IGBT) device. Alternatively, the primary switches can be any controllable switches such as integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices and/or the like.

It should be noted that while the example throughout the description is based upon a full-bridge converter (e.g., full-bridge converter 106 shown in FIG. 3), the implementation of the transmitter circuit 107 shown in FIG. 1 may have many variations, alternatives, and modifications. For example, half-bridge converters, push-pull converters, class E based power converters (e.g., a class E amplifier) may be alternatively employed. Furthermore, an inductor-inductor-capacitor (LLC) resonant converter may be formed when the transmitter coil L1 is tightly coupled with the receiver coil L2 in some applications.

In sum, the full-bridge converter 106 illustrated herein is limited solely for the purpose of clearly illustrating the inventive aspects of the various embodiments. The present invention is not limited to any particular power topology.

It should further be noted that while FIG. 3 illustrates four switches S1-S4, various embodiments of the present disclosure may include other variations, modifications and alternatives. For example, a separate capacitor may be connected in parallel with each switch of the full-bridge converter 106. Such a separate capacitor helps to better control the timing of the resonant process of the full-bridge converter 106.

The full-bridge converter 106 further comprises a plurality of sense switches. As shown in FIG. 3, a first sense switch SS1 is connected in parallel with the switching element S1. Likewise, a second sense switch SS2 is connected in parallel with the switching element S2. A third sense switch SS3 is connected in parallel with the switching element S3. A fourth sense switch SS4 is connected in parallel with the switching element S4. The sense switches (e.g., sense switch SS1) are employed to generate accurate current measurement information based upon the current flowing through the main switching elements (e.g., switching element S1) of the full-bridge converter 106.

According to some embodiments, both the main switching elements and their corresponding sense switches are implemented as metal oxide semiconductor field effect transistor (MOSFET) or MOSFETs connected in parallel. Furthermore, the main switching elements and their corresponding sense switches may be formed by other types of controllable devices such as bipolar junction transistor (BJT) devices, super junction transistor (SJT) devices, insulated gate bipolar transistor (IGBT) devices, gallium nitride (GaN) based power devices and/or the like.

In some embodiments, the main switching element may comprise M transistor cells connected in parallel. The sense switch may comprise m transistor cells connected in parallel. In some embodiments, M is greater than m. As a result, the sense switch may scale down the current flowing through the main switching element by a ratio of M to m. In some embodiments, M is equal 3,000 and m is equal to 1. It should be noted that the ratio of 3,000 to 1 is merely an example. This ratio is selected purely for demonstration purposes and is not intended to limit the various embodiments of the present disclosure.

The sensing apparatus 202 comprises a current sense processor 302, a peak detector 304 and a filter 306. The current sense processor 302 receives the currents flowing through the sense switches (e.g., senses switches SS1 and SS2). The current sense processor 302 may comprise an amplifier, a switch and a sense resistor. The amplifier, the switch and the sense resistor form a current-mirror configuration. Through the current-mirror configuration, the voltage across the sense resistor is proportional to the current flowing through the main switching element. The sense switch current-sensing technique is well known, and hence is not discussed in further detail.

The peak detector 304 receives the sensed current generated by the current sense processor 302. The peak detector 304 generates a peak current signal Ipeak by following the input voltage until its peak point is reached and holding the peak value as the input voltage decreases. Furthermore, the peak detector 304 is capable of calculating the peak voltage Vpeak by adding a suitable phase difference (e.g., 90 degrees) into the peak current signal. The circuit of the peak detector 304 will be described below with respect to FIG. 4.

The filter 306 is employed to perform averaging on the sensed current. In some embodiments, the filter 306 is a low-pass filter such as R-C filters. The low-pass filter passes the dc component of the sensed current and blocks the high frequency components. As a result of applying the filtering to the sensed current, an average current signal is generated at the output of the filter 306.

Figure 4:
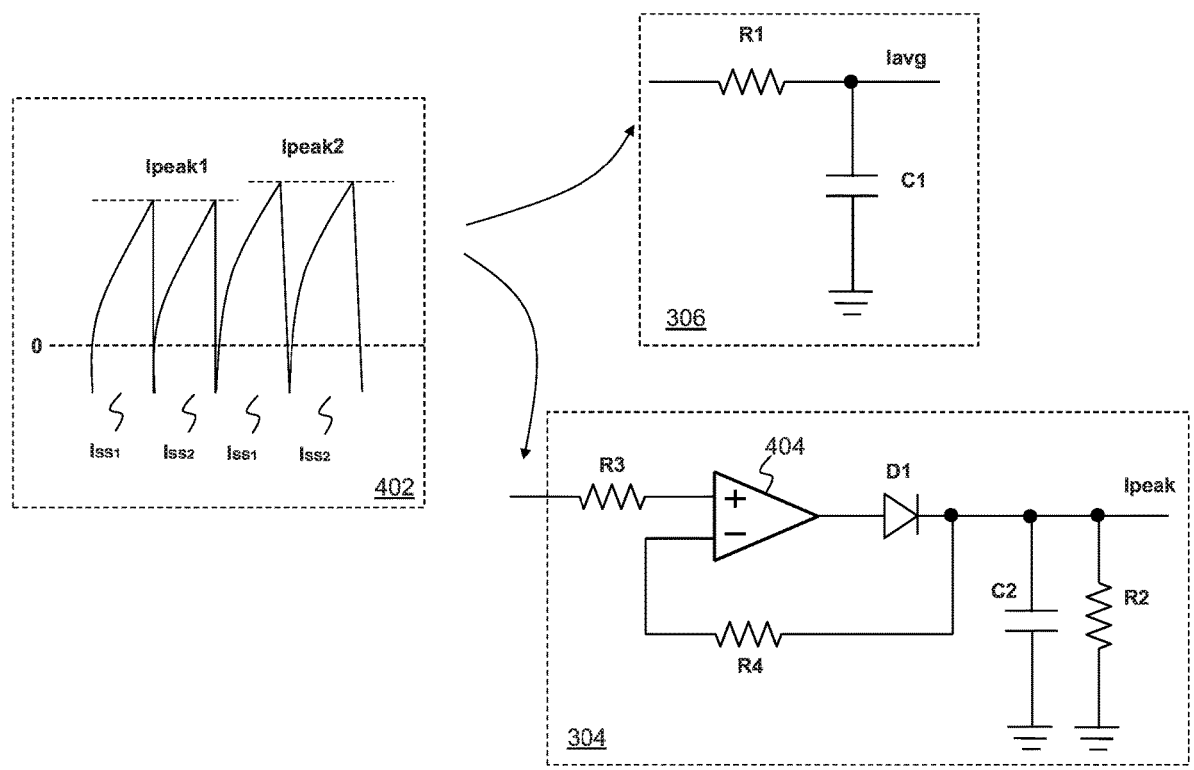
FIG. 4 illustrates a schematic diagram of the filter and the peak detector shown in FIG. 3 in accordance with various embodiments of the present disclosure.

FIG. 4 illustrates a schematic diagram of the filter and the peak detector shown in FIG. 3 in accordance with various embodiments of the present disclosure. The current sense processor 302 (shown in FIG. 3) generates a sensed current signal 402. The sensed current signal 402 is fed into the filter 306 and the peak detector 304 respectively. In some embodiments, the sensed current signal 402 is detected from the first sense switch SS1 and the second sense switch SS2. In other words, the sensed current signal 402 is generated based upon the current information from the two high-side sense switches. In alternative embodiments, the sensed current signal 402 is detected from the third sense switch SS3 and the fourth sense switch SS4. In other words, the sensed current signal 402 is generated based upon the current information from the two low-side sense switches.

As shown in FIG. 4, the sensed current signal 402 comprises a plurality of current pulses. As shown in FIG. 4, two adjacent current pulses (e.g., Iss1 and Iss2) are detected from the first sense switch SS1 and the second sense switch SS2 respectively. As shown in FIG. 4, the sensed current signal 402 has two peaks, namely Ipeak1 and Ipeak2. The peak detector 304 is employed to detect the peak values of Ipeak1 and Ipeak2. The filter 306 is employed to obtain the average current value of the sensed current signal 402.

The filter 306 comprises a resistor R1 and a capacitor C1. The resistor R1 and the capacitor C1 form a low-pass filter. The peak detector 304 comprises an amplifier 404, a diode D1, resistors R2, R3 and R4 and a capacitor C2. As shown in FIG. 4, resistor R3 is connected between an input of the peak detector 304 and a non-inverting input of the amplifier 404. Diode D1 is connected between an output of the amplifier 404 and an output of the peak detector 304. Resistor R4 is connected between an inverting input of the amplifier 404 and a cathode of diode D1. Resistor R2 and capacitor C2 are connected in parallel between the output of the peak detector 304 and ground. The operating principle of the peak detector 304 is well known, and hence is not discussed herein.

One skilled in the art will recognize that the filter 306 shown in FIG. 4 is simply one manner of averaging the sensed current signal 402 and that other and alternate embodiment filters could be employed (such as employing a plurality of filter stages connected in cascade). Likewise, One skilled in the art will recognize that the peak detector 304 shown in FIG. 4 is simply one embodiment and that other configurations for detecting the peak value can be employed.

Figure 5:
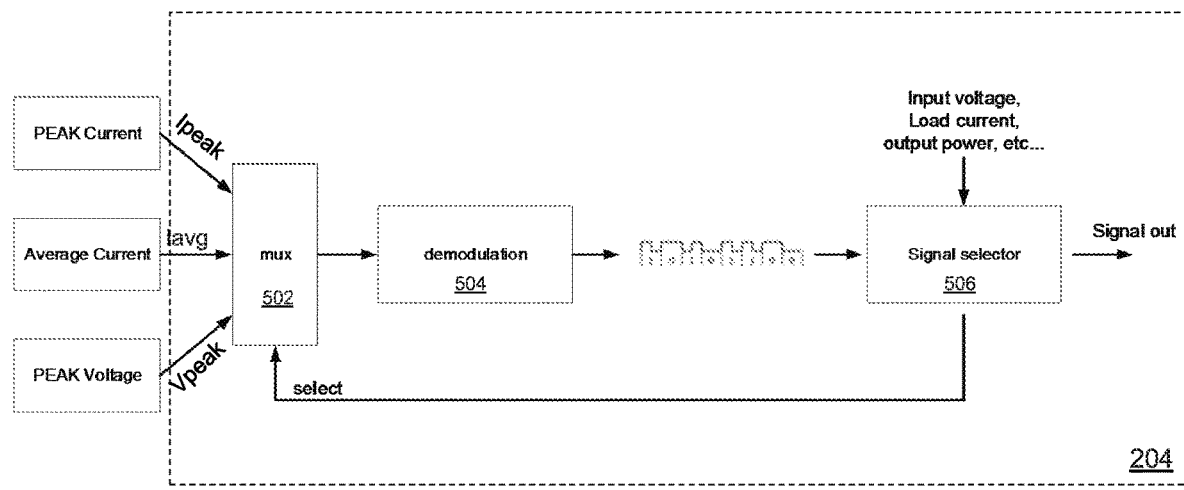
FIG. 5 illustrates a block diagram of a first implementation of the demodulation apparatus in accordance with various embodiments of the present disclosure.

FIG. 5 illustrates a block diagram of a first implementation of the demodulation apparatus in accordance with various embodiments of the present disclosure. The demodulation apparatus 204 comprises a demodulation channel 504 coupled between a multiplexer 502 and a signal selector 506. As shown in FIG. 5, the peak current signal Ipeak, the average current signal Iavg and the peak voltage signal Vpeak generated by the sensing apparatus 202 are fed into the multiplexer 502. The demodulation channel 504 selectively processes one of the peak current signal Ipeak, the average current signal Iavg and the peak voltage signal Vpeak. In other words, the three signals Ipeak, Iavg and Vpeak share the demodulation channel 504. At different time instants, the demodulation channel 504 may demodulate different signals. As such, the output of the demodulation channel 504 generates a plurality of digital signals (the digital signals demodulated from Ipeak, Iavg and Vpeak). The plurality of digital signals is fed into the signal selector 506.

In operation, in some embodiments, the signal selector 506 selects one of the peak current signal, the average current signal and the peak voltage to be processed by the demodulation channel 504 based upon the signal quality of the digital signals generated by the demodulation channel 504. In some embodiments, the signal quality of the digital signals may be evaluated based upon the black spots of the digital signals. The black spots of the three digital signals occur at different time instants. At a particular time instant, at least one digital signal has better signal quality.

The signal selector 506 sends the signal selection signal to the multiplexer 502. Based upon the signal selection signal, the multiplexer 502 determines which signal (one of Ipeak, Iavg and Vpeak) is to be processed by the demodulation channel 504. Furthermore, based upon the signal selection signal, the multiplexer 502 is able to determine how long the selected signal occupies the demodulation channel 504 and the switching between the selected signal and one unselected signal.

In alternative embodiments, the signal selector 506 selects one of the peak current signal, the average current signal and the peak voltage signal to be processed by the demodulation channel 504 based upon the operating parameters such as the input voltage, the load current and the output power of the wireless power transfer system. Furthermore, the signal selector 506 may select one of the peak current signal, the average current signal and the peak voltage signal to be processed by the demodulation channel 504 based upon a combination of the operating parameters and the signal quality of the digital signals generated by the demodulation channel 504.

One advantageous feature of the system configuration shown in FIG. 5 is the demodulation apparatus 204 provides more robustness and flexibility under different operating conditions. Furthermore, the demodulation apparatus 204 can be easily implemented on a semiconductor chip with small-scale integrated circuits.

Figure 6:
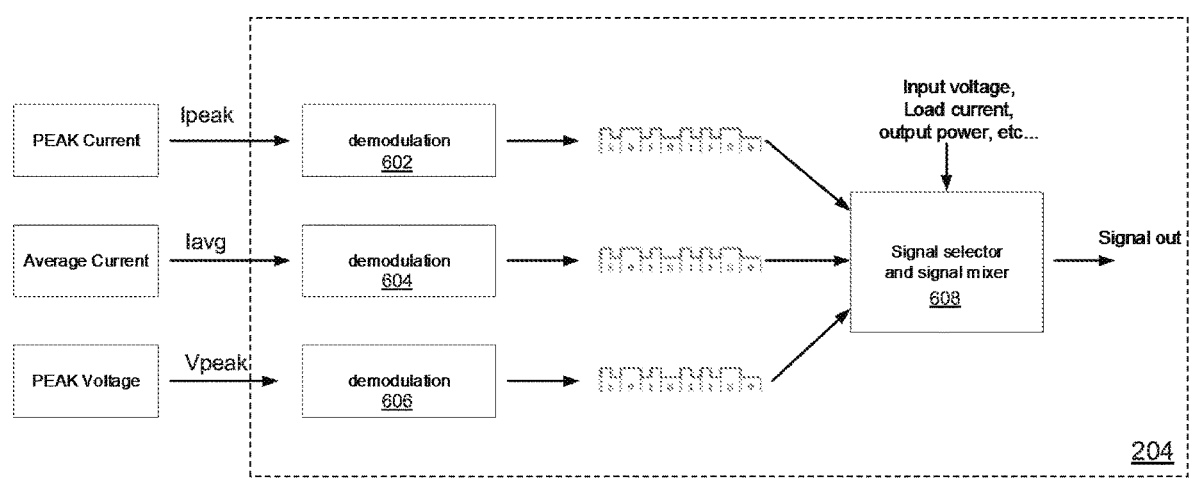
FIG. 6 illustrates a block diagram of a second implementation of the demodulation apparatus in accordance with various embodiments of the present disclosure.

FIG. 6 illustrates a block diagram of a second implementation of the demodulation apparatus in accordance with various embodiments of the present disclosure. The demodulation apparatus 204 comprises a first demodulation channel 602 configured to receive the peak current signal Ipeak, a second demodulation channel 604 configured to receive the average current signal Iavg and a third demodulation channel 606 configured to receive the peak voltage signal Vpeak. As shown in FIG. 6, the peak current signal Ipeak, the average current signal Iavg and the peak voltage signal Vpeak are converted into their respective digital signals and fed into a signal selector/mixer 608.

The signal selector/mixer 608 checks and evaluates a plurality of parameters of the digital signals such as the signal quality, the signature of the digital signals and other useful system information. Based upon the parameters of the digital signals and operating parameters of the wireless power transfer system, the signal selector/mixer 608 may select one digital signal as an output signal for controlling the operation of the wireless power transfer system. Alternatively, the signal selector/mixer 608 may mix the received digital signals intelligently to obtain a better output signal for controlling the operation of the wireless power transfer system. Such a mixed signal helps to improve the robustness and flexibility of the demodulation apparatus 204.

It should be noted that while FIG. 6 illustrates the demodulation apparatus 204 with three demodulation channels 602, 604 and 606, the demodulation apparatus 204 could accommodate any number of demodulation channels. In some embodiments, there may be two demodulation channels configured to process the peak current signal Ipeak, the average current signal Iavg and the peak voltage signal Vpeak. One advantageous feature of having two demodulation channels is the total cost of implementing the demodulation apparatus 204 can be reduced accordingly.

Figure 7:
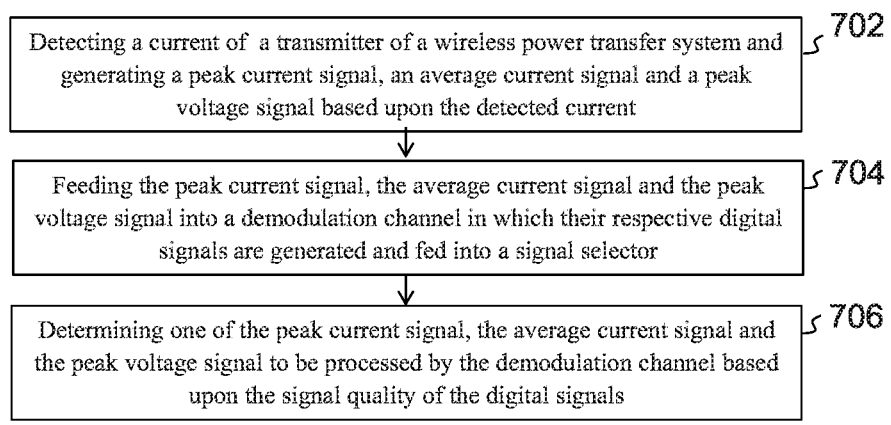
FIG. 7 illustrates a flow chart of applying a first demodulation control mechanism to the demodulation apparatus in accordance with various embodiments of the present disclosure.

FIG. 7 illustrates a flow chart of applying a first demodulation control mechanism to the demodulation apparatus in accordance with various embodiments of the present disclosure. This flowchart shown in FIG. 7 is merely an example, which should not unduly limit the scope of the claims. One of ordinary skill in the art would recognize many variations, alternatives, and modifications. For example, various steps illustrated in FIG. 7 may be added, removed, replaced, rearranged and repeated.

At step 702, a current flowing through a transmitter of a wireless power transfer system is detected by a sensing apparatus. The detected current is processed by a filter and a peak detector. The filter generates an average current signal. The peak detector generates a peak current signal. Based upon the peak current signal, a peak voltage signal is generated by adding a suitable phase difference into the peak current signal.

At step 704, the peak current signal, the peak voltage signal and the average current signal are fed into a demodulation channel in which their respective digital signals are generated and fed into a signal selector.

At step 706, the peak current signal, the peak voltage signal and the average current signal share a single demodulation channel. The signal selector determines one of the peak current signal, the peak voltage signal and the average current signal to be processed by the demodulation channel based upon the signal quality of the digital signals.

Figure 8:
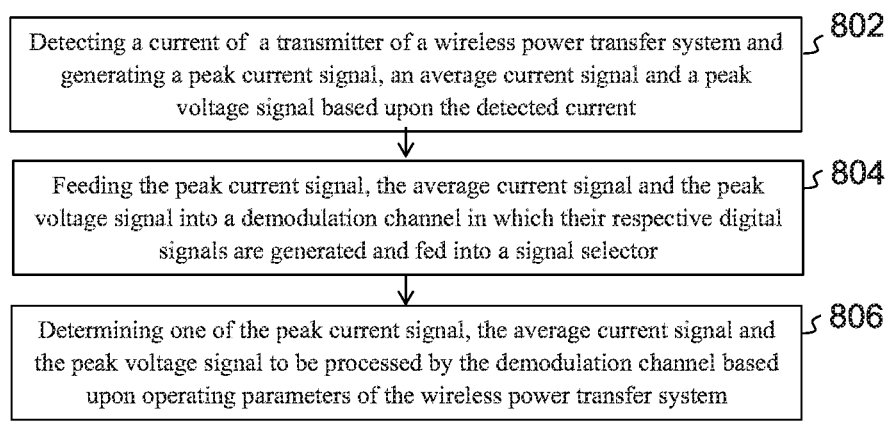
FIG. 8 illustrates a flow chart of applying a second demodulation control mechanism to the demodulation apparatus in accordance with various embodiments of the present disclosure.

FIG. 8 illustrates a flow chart of applying a second demodulation control mechanism to the demodulation apparatus in accordance with various embodiments of the present disclosure. This flowchart shown in FIG. 8 is merely an example, which should not unduly limit the scope of the claims. One of ordinary skill in the art would recognize many variations, alternatives, and modifications. For example, various steps illustrated in FIG. 8 may be added, removed, replaced, rearranged and repeated.

At step 802, a current flowing through a transmitter of a wireless power transfer system is detected by a sensing apparatus. The detected current is processed by a filter and a peak detector. The filter generates an average current signal. The peak detector generates a peak current signal. Based upon the peak current signal, a peak voltage signal is generated by adding a suitable phase difference into the peak current signal.

At step 804, the peak current signal, the peak voltage signal and the average current signal are fed into a demodulation channel in which their respective digital signals are generated and fed into a signal selector.

At step 806, the peak current signal, the peak voltage signal and the average current signal share a single demodulation channel. The signal selector determines one of the peak current signal, the peak voltage signal and the average current signal to be processed by the demodulation channel based upon the operating parameters of the wireless power transfer system. In some embodiments, the operating parameters of the wireless power transfer system include the input voltage, the load current, the output power, any combinations thereof and the like.

Figure 9:
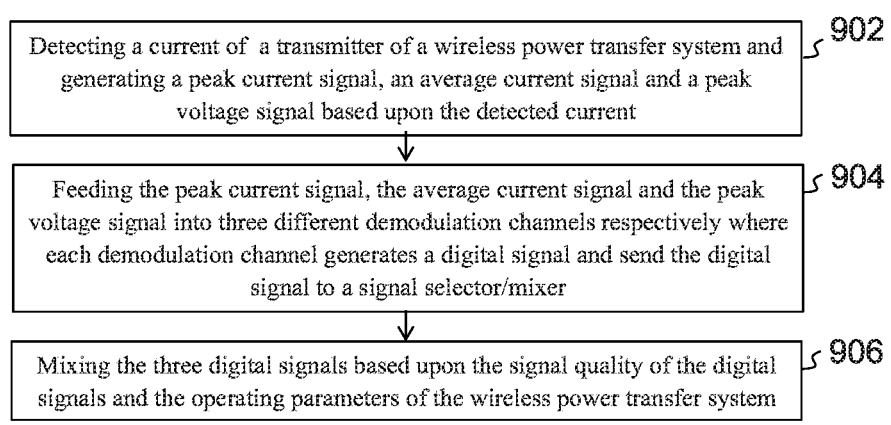
FIG. 9 illustrates a flow chart of applying a third demodulation control mechanism to the demodulation apparatus in accordance with various embodiments of the present disclosure.

FIG. 9 illustrates a flow chart of applying a third demodulation control mechanism to the demodulation apparatus in accordance with various embodiments of the present disclosure. This flowchart shown in FIG. 9 is merely an example, which should not unduly limit the scope of the claims. One of ordinary skill in the art would recognize many variations, alternatives, and modifications. For example, various steps illustrated in FIG. 9 may be added, removed, replaced, rearranged and repeated.

At step 902, a current flowing through a transmitter of a wireless power transfer system is detected by a sensing apparatus. The detected current is processed by a filter and a peak detector. The filter generates an average current signal. The peak detector generates a peak current signal. Based upon the peak current signal, a peak voltage signal is generated by adding a suitable phase difference into the peak current signal.

At step 904, the peak current signal is fed into a first demodulation channel in which a corresponding digital signal is generated and fed into a signal selector/mixer. The peak voltage signal is fed into a second demodulation channel in which a corresponding digital signal is generated and fed into the signal selector/mixer. The average current signal fed into a third demodulation channel in which a corresponding digital signal is generated and fed into the signal selector/mixer.

At step 906, the signal selector/mixer mixes the received digital signals intelligently to obtain a better signal based upon the operating parameters of the wireless power transfer system. In some embodiments, the operating parameters of the wireless power transfer system include the input voltage, the load current, the output power, any combinations thereof and the like.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A device comprising:
   a first current sense apparatus coupled to a first switching element of a power conversion apparatus, wherein the power conversion apparatus is a full-bridge power converter, and wherein the first current sense apparatus is a first sense transistor connected in parallel with a first switch of the full-bridge power converter;
   a second current sense apparatus coupled to a second switching element of the power conversion apparatus, wherein the second current sense apparatus is a second sense transistor connected in parallel with a second switch of the full-bridge power converter; and
   a current sense processing apparatus configured to receive detected current signals from the first current sense apparatus and the second current sense apparatus, and generate an average current signal and a peak current signal.

2. The device of claim 1, wherein:
   the full-bridge power converter is connected to a transmitter coil of a wireless power transfer system.

3. The device of claim 2, wherein:
   the first switch is a first high-side switch of the full-bridge power converter; and
   the second switch is a second high-side switch of the full-bridge power converter.

4. The device of claim 2, wherein:
   the first switch is a first low-side switch of the full-bridge power converter; and
   the second switch is a second low-side switch of the full-bridge power converter.

5. The device of claim 1, wherein:
   the current sense processing apparatus is configured to generate a peak voltage signal through adding a phase difference into the peak current signal.

6. The device of claim 1, wherein:
   the current sense processing apparatus comprises a current sense processor, a filter and a peak detector, and wherein the current sense processor is configured to generate a scaled down current signal proportional to currents flowing through the first switching element and the second switching element.

7. The device of claim 6, wherein:
   the filter is configured to generate the average current signal based upon the scaled down current signal; and
   the peak detector is configured to generate the peak current signal based upon the scaled down current signal.

8. A method comprising:
   detecting a current flowing through a transmitter of a wireless power transfer system through a first current sense apparatus coupled to a first switching element of the transmitter and a second current sense apparatus coupled to a second switching element of the transmitter;
   generating, by a current sense processing apparatus, a peak current signal, an average current signal and a peak voltage of the transmitter based upon detected current signals; and
   feeding the peak current signal, the average current signal and the peak voltage of the transmitter into a signal selector through a demodulation apparatus.

9. The method of claim 8, further comprising:
converting the peak current signal, the average current signal and the peak voltage of the transmitter into digital signals through the demodulation apparatus;
selecting one of the peak current signal, the average current signal and the peak voltage of the transmitter based upon signal quality of the digital signals; and
processing the one of the peak current signal, the average current signal and the peak voltage of the transmitter in the demodulation apparatus, wherein the demodulation apparatus comprises a single demodulation channel coupled between the current sense processing apparatus and the signal selector.

10. The method of claim 8, further comprising:
selecting one of the peak current signal, the average current signal and the peak voltage of the transmitter based upon operating parameters of the transmitter; and
processing the one of the peak current signal, the average current signal and the peak voltage of the transmitter in the demodulation apparatus, wherein the demodulation apparatus comprises a single demodulation channel coupled between the current sense processing apparatus and the signal selector.

11. The method of claim 8, further comprising:
converting the peak current signal, the average current signal and the peak voltage of the transmitter into digital signals through the demodulation apparatus;
selecting one of the peak current signal, the average current signal and the peak voltage of the transmitter based upon signal quality of the digital signals and operating parameters of the transmitter; and
processing the one of the peak current signal, the average current signal and the peak voltage of the transmitter in the demodulation apparatus, wherein the demodulation apparatus comprises a single demodulation channel coupled between the current sense processing apparatus and the signal selector.

12. The method of claim 8, further comprising:
processing the peak current signal, the average current signal and the peak voltage of the transmitter to generate three digital signals in the demodulation apparatus, wherein the demodulation apparatus comprises three demodulation channels coupled between the current sense processing apparatus and the signal selector.

13. The method of claim 12, further comprising:
feeding the three digital signals converted from the peak current signal, the average current signal and the peak voltage of the transmitter respectively into the signal selector; and
mixing the three digital signals to generate an output signal based upon signal quality of the three digital signals.

14. The method of claim 8, further comprising:
processing two signals of the peak current signal, the average current signal and the peak voltage of the transmitter in the demodulation apparatus, wherein the demodulation apparatus comprises two demodulation channels coupled between the current sense processing apparatus and the signal selector.

15. The method of claim 8, wherein the transmitter comprises a full-bridge power converter, and wherein:

the first current sense apparatus is a first sense transistor connected in parallel with a first high-side switch of the full-bridge power converter; and
the second current sense apparatus is a second sense transistor connected in parallel with a second high-side switch of the full-bridge power converter.

16. A system comprising:
a bridge converter having inputs coupled to a power source and outputs connected to an inductor-capacitor tank;
a current sense apparatus configured to detect a current flowing through the inductor-capacitor tank;
a current sense processing apparatus configured to generate a peak current, an average current and a peak voltage of the inductor-capacitor tank based upon detected current signals from the current sense apparatus; and
a demodulation apparatus converting the peak current, the average current and the peak voltage of the inductor-capacitor tank into digital signals.

17. The system of claim 16, wherein:
the bridge converter is a full-bridge power converter; and
the current sense apparatus comprises a first sense transistor connected in parallel with a first high-side switch of the full-bridge power converter and a second sense transistor connected in parallel with a second high-side switch of the full-bridge power converter.

18. The system of claim 16, further comprising:
a signal multiplexer coupled between the current sense processing apparatus and an input of the demodulation apparatus; and
a signal selector having an input connected to an output of the demodulation apparatus, wherein the signal selector is configured to select one of the peak current, the average current and the peak voltage of the inductor-capacitor tank to be processed by the demodulation apparatus, and wherein the demodulation apparatus comprises a single demodulation channel coupled between the signal multiplexer and the signal selector.

19. The system of claim 16, further comprising:
a signal selector configured to receive a plurality of digital signals sent from the demodulation apparatus and mix the plurality of digital signals to generate an output signal based upon signal quality of the plurality of digital signals, wherein the demodulation apparatus comprises a first demodulation channel configured to receive the peak current of the inductor-capacitor tank, a second demodulation channel configured to receive the average current of the inductor-capacitor tank and a third demodulation channel configured to receive the peak voltage of the inductor-capacitor tank.

20. The system of claim 16, further comprising:
a filter generating the average current of the inductor-capacitor tank at an output of the filter, wherein an input of the filter is configured to receive the detected current signals from the current sense apparatus; and
a peak detector generating the peak current of the inductor-capacitor tank at an output of the peak detector, wherein an input of the peak detector is configured to receive the detected current signals from the current sense apparatus.

* * * * *